United States Patent

[11] 3,623,513

| [72] | Inventor | Henry T. Dinkelkamp<br>Mount Prospect, Ill. |
|---|---|---|
| [21] | Appl. No. | 11,579 |
| [22] | Filed | Feb. 16, 1970 |
| [45] | Patented | Nov. 30, 1971 |
| [73] | Assignee | Stewart-Warner Corporation<br>Chicago, Ill. |

[54] HIGH-PRESSURE FLEXIBLE HOSE SHEATH
7 Claims, 5 Drawing Figs.

[52] U.S. Cl................................................. 138/114,
138/135, 138/148, 138/154, 285/13
[51] Int. Cl...................................................... F16l 9/18,
F16l 9/14
[50] Field of Search........................................... 138/114,
134, 135, 148, 154; 285/13, 149, 45

[56] References Cited
UNITED STATES PATENTS

| 1,091,759 | 3/1914 | Paradis...................... | 138/135 X |
| 1,497,652 | 6/1924 | Browne....................... | 285/13 |
| 3,204,666 | 9/1965 | Lindsay....................... | 138/135 |

FOREIGN PATENTS

| 853,277 | 11/1939 | France........................ | 285/226 |
| 430,260 | 2/1948 | Italy............................ | 138/134 |

*Primary Examiner*—Herbert F. Ross
*Attorneys*—Augustus G. Douvas, William J. Newman and Norton Lesser

ABSTRACT: The following specification describes a metal sheath enclosing a high-pressure flexible hose with the sheath arranged in interlocked spiral turns spaced from the hose and axially movable relative to the hose.

PATENTED NOV 30 1971 3,623,513
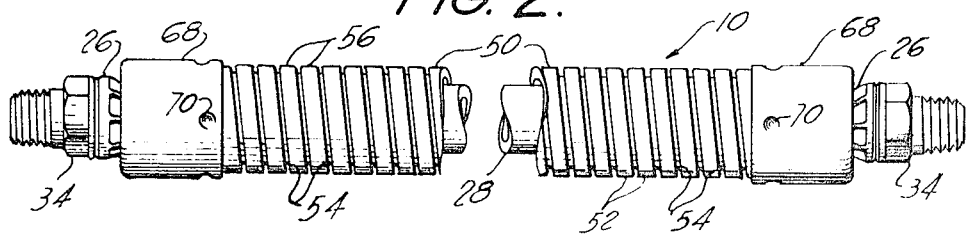
FIG. 2.
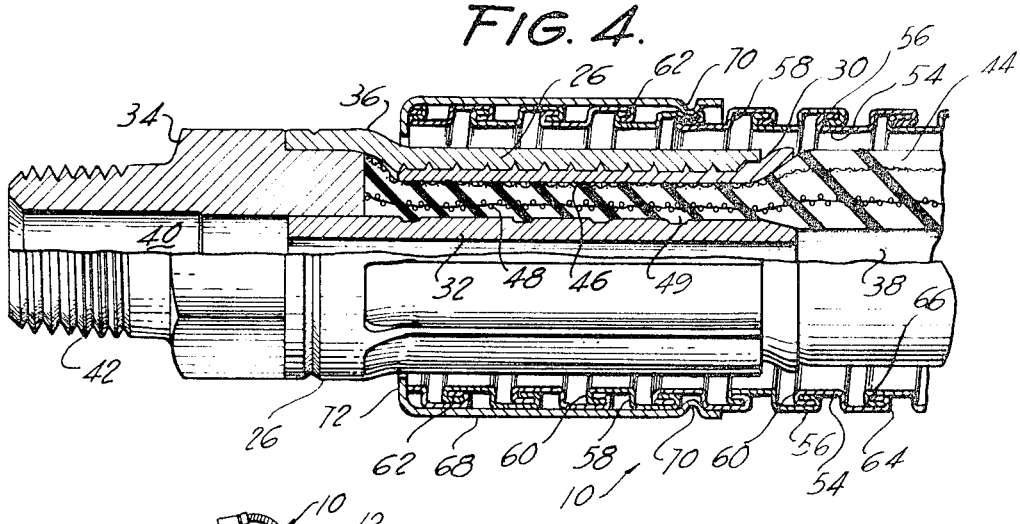
FIG. 4.
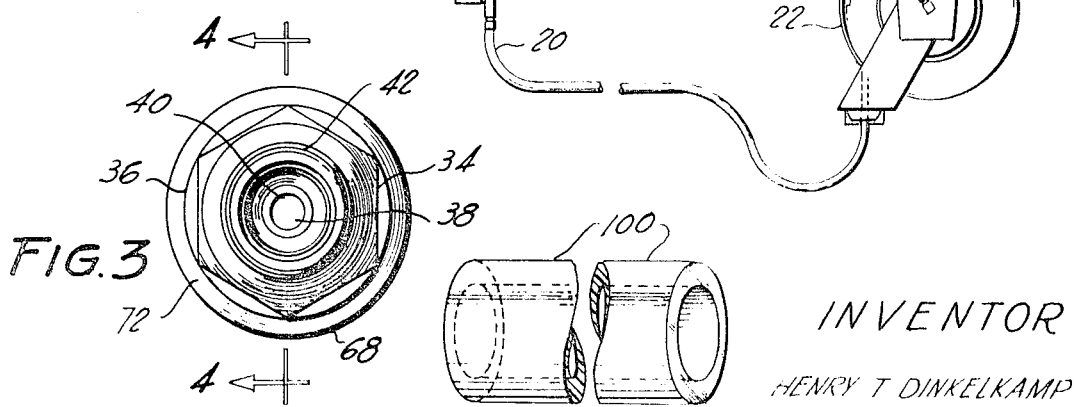
FIG. 1.
FIG. 3.
FIG. 5.
INVENTOR
HENRY T DINKELKAMP
By Norton Lesser
ATTORNEY

3,623,513

HIGH-PRESSURE FLEXIBLE HOSE SHEATH

BACKGROUND OF THE INVENTION

1. Field of the Invention

This invention relates in general to high-pressure flexible hoses and more particularly to a metal sheath for enclosing a high-pressure flexible hose.

2. Description of the Prior Art

Flexible hoses carrying fluids under high pressure are subject to failure, especially after long periods of field use. The pressures often range up to 4,000 p.s.i. and even 6,000 p.s.i. and when the hose is ruptured, the fluid escapes with explosive violence. The hoses are flexible to facilitate manual handling and if the burst or rupture occurs in an area in which the hands are engaged, penetration of the skin often results. Where the fluid is a material, such as grease, penetration of the skin can cause serious infection sometimes necessitating amputation.

Since the hoses must be flexible to permit facile extension, retraction and bending around corners, a solid or fixed metal sheath cannot be provided, while the simple wire or metal braid often used in flexible hoses or casings does not prevent rupture or skin penetration by the fluid in the event of rupture.

SUMMARY OF THE INVENTION

The present invention solves the above problems by providing a sheath spaced a short distance from the flexible hose. Preferably, the sheath is a metal coil of interlocked spiral turns. The interlocked turns are provided by means of a reverse bend on each edge of each turn in overlapped engagement with a reverse bend on the adjacent turn to prevent separation of the turns in the event of either bursting or whipping of the hose as sometimes occurs. A ferrule is crimped on the last few turns of the sheath and the sheath together with the sheath ferrule are slidingly received over the hose ferrule so that the entire sheath may move axially of the hose and accommodate the hose bends. Since the sheath ferrule is slightly larger than the hose ferrule, a restricted annulus is provided for fluid escape at low velocity to avoid sheath rupture or penetration of the operator's skin.

Accordingly, it is one object of the present invention to enable safe handling of a flexible hose carrying a fluid under high pressure.

Other objects and features of the present invention will become apparent on examination of the following specification, claims and drawings.

BRIEF DESCRIPTION OF THE DRAWINGS

FIG. 1 illustrates a typical installation utilizing a high-pressure hose;

FIG. 2 is an enlarged view illustrating the hose and sheath assembly;

FIG. 3 is an end view of the hose and sheath assembly;

FIG. 4 is a partial sectional view of the hose and sheath assembly taken along the line 4—4 in FIG. 3 to illustrate the construction; and FIG. 5 illustrates a sheath formed of a plastic material.

DESCRIPTION OF THE HIGH-PRESSURE HOSE AND SHEATH ASSEMBLY

In FIGS. 1 and 2 a high-pressure hose and sheath assembly is indicated generally by the reference character 10. As seen in FIG. 1, the hose assembly 10, usually between 8 inches and 10 inches long, is typically connected at one end to the rigid nozzle 12 of a hand valve 14 by means of a hydraulic coupling 16. The hand valve 14 has a trigger 18 for opening the normally closed valve, which is connected by means of conventional couplings to one end of a hose 20. Hose 20 is usually wound on a reel 22 for facile extension and retraction of the hose. Hose 20 is supplied with lubricant or grease under high pressure through a hose section 24, which extends from the reel to a source for high pressure fluid (not shown).

The reel 22 is usually mounted on an overhead support by means of a bracket and hose 20 is extended by grasping valve 14 and pulling the hose. Valve 12 is then usually held in one hand and the assembly 10 held in the other for placing a sleeve type coupling 25 on the free end of assembly 10 in fluid communication with a fitting through which lubrication is transmitted to a bearing. The valve trigger 18 is then operated to permit the fluid under pressure to be extruded through the nozzle 12, the hydraulic coupling 16, the assembly 10, coupling 25 and the bearing fitting. In order for the described fluid path to be established for the valve 12, it is necessary that the assembly 10 be flexible so that it may bend around obstructions and be manually or hand-held to ensure proper fluid communication. The various elements 12, 14, 16, 18, 20, 22, 24 and 25 are conventional and, for example, may be of the type shown in Catalog 1 entitled "Automotive Lubrication Equipment," issued by the Stewart-Warner Corporation, 1826 Diversey Parkway, Chicago, Ill.

The assembly 10 includes a conventional metal ferrule 26 having an O.D. of approximately one-half inch located at each end of a composite flexible hose 28 usually about 10 inches long. Each ferrule 26 is crimped over a bushing 30, which overlaps the skived end of the hose 28, and a tubular metal stud 32 extending from an adapter 34 is inserted in each hose end to fix the respective end of the hose 28 between the ferrule and stud. The ferrule 26 extends beyond the hose end and is flared outwardly for engagement over the adapter 34 to form a shoulder 36 that is crimped about the adapter 34 so that leakage cannot occur between the hose end and the adapter end. Fluid moves through a passage 38 defined by the hose and a passage 40 formed in the stud and adapter. The external surface of the adapter 34 is provided with threads 42 adjacent the end opposite shoulder 36 and is shaped intermediate the adapter ends to receive a wrench so that the hydraulic coupling 16 and sleeve coupling 25 may be securely threaded onto the respective adapters.

The flexible hose 28 usually comprises a plastic or rubber material 44 extruded onto a fabric braid 46 overlying a wire braid 48, which in turn covers an inner rubber tube 49 defining fluid passageway 38.

The hose 28 has an I.D. of approximately three-sixteenths inch and an O.D. of approximately one-half inch and is encircled by a metal sheath 50. Sheath 50 comprises a metal coil or helice with each turn 52 of the helice formed by axially spaced integral helical walls 54 and 56 substantially 0.01 inch thick with wall 54 having an I.D. of substantially 0.64 inch and wall 56 having an O.D. of substantially 0.74 inch so that wall 54 is offset radially inwardly of wall 56.

The two walls 54 and 56 are interconnected at one edge by a short radial wall 58. At the opposite edge, the wall 54 has an outwardly extending radial wall 60 terminating in a short axial wall 62 overlapping a portion of a wall 54 and in turn overlappingly engaged by a portion of wall 56 of the adjacent turn.

The opposite edge of each wall 56 has an inwardly extending radial wall 64 terminating in a short axial wall 66 overlapped and engaged by wall 62 of the adjacent turn so that the walls 62 and 66 form interlocked offset walls nested and engaged against walls 56 and 54 respectively to close the sheath against the passage of fluid radially of the sheath, yet permitting adjacent turns to move axially relative each other.

The turns 52 of the coil extend over respective hose ferrules 26 for approximately 1 inch, and a coil ferrule 68 is fitted over each end of the coil turns 52. The ferrules 68 each comprise an elongate tubular section having an I.D. of substantially 0.8 inch and a wall thickness of 0.02 inch for overlapping the tubular portion of ferrules 26 and the corresponding end turns 52 of the sheath. Each ferrule 68 is provided with crimps 70 adjacent the end opposite the adapters to fasten the ferrules to the sheath. A radial annular wall 72 is formed at the end of each ferrule 68 adjacent the respective last turn 52 with wall 72 having an I.D. of substantially 0.62 inch so that it may slide axially over each hose ferrule 26, but cannot pass the shoulders 34 and disengage from the hose. The sheath 50 is axially confined between the ferrule shoulders 36, but each turn 52 can move axially relative the adjacent turn 42 and the entire sheath 50 can move a short axial distance relative the hose. The openings in radial walls 72 are slightly larger than the diameter of the hose ferrules 26 so that a restricted end orifice is formed for the sheath.

The hose assembly 10 is coupled to valve 14 by means of coupling 16 threaded on one of the adapters 34 and is manually held in fluid communication with a bearing fitting by means of coupling 25 threaded on the other adapter as previously described. The hose assembly 10 can be bent as, for example, shown in FIG. 1, to snake around corners or pass between obstructions, since both ends of coil 50 and each coil turn 52 can shift axially. This permits the turns to abut each other at the inner portion of a bend or curve and expand or separate at the outer portion of the curve to permit bends up to 90°.

Operation of valve 12 of course permits the application of fluid under pressure to the apparatus to be lubricated. In the event hose 28 should burst, the fluid is extruded into the space of about 0.14 inch between coil 50 and the hose 28. Since each coil turn 52 is provided with the overlapped walls 62 and 66 in abutting relationship with each other and walls 54 and 56, no opening is presented between the turns to permit fluid leakage therethrough at any substantial pressure. At the same time, the sheath or coil 52 is permitted to move axially of hose 28, since the ferrules 68 are not fixed to ferrules 26. This movement, together with the expansion permitted by axial movement of each turn relative to the other, absorbs the initial shock resulting from the rupture to protect the operator's hand. As the space between the sheath and hose fills, the fluid may escape through the space between radial wall 72 and ferrule 26, which are spaced by approximately 0.12 inch, but at such reduced pressure as to constitute no serious danger and usually after a time period in which the operator has an opportunity to either or both remove his hand or close valve 14.

In certain situations, it may be possible to avoid the use of metal for the sheath and instead utilize a tough plasticlike material or braided material for the sheath. In FIG. 5, a sheath 100 of plastic is illustrated. The sheath 100 is a tough flexible tube of such material as polyvinyl chloride having an inner diameter sized to slide over hose 28 but not past the ferrule shoulders 36. A wall thickness of three-sixteenths inch or more is provided for sheath 100 to prevent fluid extrusion.

The foregoing is a description of a high pressure flexible hose having improved safety features whose inventive concepts are believed set forth in the accompanying claims.

What is claimed is:

1. A high-pressure hose combination adapted to be handheld comprising a flexible hose for containing a fluid under high pressure, a flexible sheath enclosing only the complete periphery of said hose for the axial length of said hose and radially spaced from said hose to provide a generally annular fluid transmitting gap extending axially to the ends of said sheath, and means at the ends of said sheath for providing less resistance to the axial extrusion of fluid from said gap than the radial extrusion of said fluid through said sheath in response to the bursting of said hose.

2. The sheath claimed in claim 1 in which said sheath is formed of a material withstanding a pressure of at least 4,000 p.s.i. without fracture to prevent radial extrusion of said fluid.

3. For use with the sheath claimed in claim 1, means for enabling axial movement within opposite predetermined limits of each end of said sheath relative said hose in response to only axial displacement of either said sheath or said hose.

4. A high-pressure hose combination adapted to be handheld comprising a flexible hose for communicating fluid under high pressure to a fitting, a ferrule fixed over each end of said hose to clamp said hose to a respective adapter arranged to communicate said fluid either to or from said hose, a metal coil having a plurality of turns extending over said hose with the internal diameter of said coil spaced radially outwardly from said hose to define a generally annular fluid transmitting gap extending axially to each hose ferrule, each turn of said coil having integrally formed radially and axially spaced walls with each spaced wall having an integrally formed radially offset wall interlocking a radially spaced and offset wall of an adjacent turn to facilitate limited axial movement of each turn relative each other turn without axial separation of said turns, and a ferrule fixed to said coil at opposite ends and overlapping each hose ferrule for axial movement relative the respective hose ferrule and spaced radially of the respective hose ferrule for enabling the axial extrusion of fluid from said gap between said metal coil and said hose under less resistance than the radial extrusion of said fluid from between the turns of said coil in response to the bursting of said hose.

5. A high-pressure hose combination adapted to be handheld comprising a flexible hose for communicating fluid under high pressure to a fitting, a ferrule fixed to each end of said hose, the improvement comprising a metal coil having a plurality of interlocked axially movable turns extending over said hose with the internal diameter of said coil spaced radially outwardly from said hose to define a generally annular fluid transmitting gap extending axially to each hose ferrule, a ferrule fixed to opposite ends of said metal coil and overlapping a respective hose ferrule with each coil ferrule being axially movable relative the respective hose ferrule, and a passageway formed between each coil ferrule and the respective hose ferrule for enabling the axial extrusion of fluid from said gap to atmosphere with less resistance than the resistance to radial extrusion through said coil in response to the bursting of said hose.

6. The combination claimed in claim 5 in which said coil has an axial length between 8 inches and 10 inches and said fluid is under pressure of at least 4,000 p.s.i. and said coil has an inner diameter of substantially 0.64 inch spaced substantially 0.14 inch from said hose.

7. The combination claimed in claim 6, in which said coil ferrule terminates in an annular wall abutting the adjacent end turn on said coil with the inner periphery of said annular wall spaced substantially 0.12 inch from the adjacent hose ferrule.

* * * * *